(12) United States Patent
Sawamura

(10) Patent No.: US 9,199,750 B2
(45) Date of Patent: Dec. 1, 2015

(54) FILM OPENING MECHANISM

(75) Inventor: Takuji Sawamura, Sakai (JP)

(73) Assignee: FUJI SEAL INTERNATIONAL, INC., Osaka (JP)

( * ) Notice: Subject to any disclaimer, the term of this patent is extended or adjusted under 35 U.S.C. 154(b) by 595 days.

(21) Appl. No.: 13/637,326

(22) PCT Filed: Dec. 22, 2010

(86) PCT No.: PCT/JP2010/073077
§ 371 (c)(1),
(2), (4) Date: Sep. 25, 2012

(87) PCT Pub. No.: WO2011/118105
PCT Pub. Date: Sep. 29, 2011

(65) Prior Publication Data
US 2013/0017290 A1     Jan. 17, 2013

(30) Foreign Application Priority Data
Mar. 26, 2010 (JP) ................................. 2010-071510

(51) Int. Cl.
*B29C 55/22* (2006.01)
*B65B 9/14* (2006.01)
*B65C 3/06* (2006.01)
*B65B 61/06* (2006.01)
*B29C 63/42* (2006.01)

(52) U.S. Cl.
CPC . *B65B 9/14* (2013.01); *B65B 61/06* (2013.01); *B65C 3/065* (2013.01); *B29C 63/423* (2013.01)

(58) Field of Classification Search
CPC .......... B29C 63/423; B65B 9/14; B65C 3/065
See application file for complete search history.

(56) References Cited

U.S. PATENT DOCUMENTS

| | | | |
|---|---|---|---|
| 3,067,718 A | 12/1962 | Kraft | |
| 4,146,219 A | 3/1979 | Phillips | |

FOREIGN PATENT DOCUMENTS

| | | |
|---|---|---|
| FR | 2 328 646 A1 | 5/1977 |
| JP | A-52-54435 | 5/1977 |
| JP | A-62-180850 | 8/1987 |

(Continued)

OTHER PUBLICATIONS

Oct. 23, 2012 International Preliminary Report on Patentability issued in International Application No. PCT/JP2010/073077 (with translation).

(Continued)

*Primary Examiner* — James Sanders
(74) *Attorney, Agent, or Firm* — Oliff PLC

(57) ABSTRACT

A film opening mechanism in which, regardless of whether a tubular film is long or short, a deviation in timing of delivery of the tubular film from a mandrel does not occur, and the tubular film does not become wrinkled. The film opening mechanism includes a mandrel for causing the tubular film to be opened into a predetermined state by fitting it thereon; a film transport unit composed of an upstream-side feed belt unit and a downstream-side feed belt unit, each having a feed belt which nips the tubular film fitted on the mandrel in cooperation with the mandrel to transport the tubular film toward a lower side of the mandrel; and attraction means for attracting the mandrel and the feed belt to each other by means of a magnetic attractive force.

15 Claims, 8 Drawing Sheets

(56) References Cited

FOREIGN PATENT DOCUMENTS

| | | |
|---|---|---|
| JP | A-63-202554 | 8/1988 |
| JP | A-10-310115 | 11/1998 |
| JP | A-10-338213 | 12/1998 |
| JP | A-11-91733 | 4/1999 |
| JP | A-2000-168742 | 6/2000 |
| JP | A-2010-70201 | 4/2010 |

OTHER PUBLICATIONS

Mar. 4, 2014 Office Action issued in Japanese Patent Application No. 2010-071510 (with translation).
Sep. 6, 2013 Supplementary European Search Report issued in European Application No. EP 10 84 8497.
Apr. 12, 2011 International Search Report issued in International Application No. PCT/JP2010/073077 (with translation).
Jan. 19, 2015 Office Action issued in European Patent Application No. 10 848 497.3.

FILM OPENING MECHANISM

TECHNICAL FIELD

The present invention relates to a film opening mechanism to be mounted in a film fitting device for causing a tubular film collapsed into a sheet to be opened into a predetermined shape to fit it on a container or another object on which the tubular film is to be fitted.

BACKGROUND ART

As shown in FIG. 7, a film opening mechanism to be mounted in a film fitting device of the above-described type includes an artillery shell shaped mandrel 63 for causing an individual tubular film F to be opened into a predetermined shape by fitting it thereon, the individual tubular film F being formed by cutting a long film LF which is collapsed into a sheet which is supplied by means of a film supply roller unit 61 composed of a drive roller 61*a* and a follower roller 61*b*, into a predetermined length using a film cutting unit 62 having cutting blades 62*a* and 62*b*; and a film transport unit 64 for transporting the tubular film F fitted on the mandrel 63 toward a lower end of the mandrel 63. The film opening mechanism is configured to deliver the tubular film F which is opened into a predetermined shape which has been transported to a lower end portion of the mandrel 63 by means of the film transport unit 64 to a film fitting position α with predetermined timing by means of a film delivery unit 65 having a pair of shot rollers 65*a* and 65*b* which nip the tubular film F in cooperation with the mandrel 63 to fit the tubular film F onto a container B which has been transferred to the film fitting position α.

As shown in FIG. 8, higher position rollers 63*a*, middle position rollers 63*b*, lower position rollers 63*c*, and lower end rollers 63*d* are each rotatably attached to the mandrel 63 on side surfaces of a lower half portion of the mandrel 63 on an upstream side and a downstream side in a transfer direction of the container B in a state in which the circumferential surfaces project slightly, and concave portions 63*e* are formed to expose lower portions of the circumferential surfaces of the middle position rollers 63*b*.

As shown in FIG. 7, the film transport unit 64 is composed of an upstream-side feed belt unit 64A and a downstream-side feed belt unit 64B respectively provided on the upstream side and the downstream side of the mandrel 63 in the transfer direction of the container B, which nip the tubular film F cut from the long film LF by means of the film cutting unit 62 in a state in which it is fitted on the mandrel 63, in cooperation with the mandrel 63 to thereby transport the tubular film F toward a lower side of the mandrel 63. The upstream-side feed belt unit 64A and the downstream-side feed belt unit 64B are each composed of a drive pulley 64*a*, four follower pulleys 64*b*, 64*c*, 64*d*, and 64*e*, and a feed belt 64*f* running around these pulleys.

The drive pulley 64*a* and the follower pulleys 64*d* and 64*e* are configured to nip the tubular film F in cooperation with the lower position roller 63*c*, the higher position roller 63*a*, and the middle position roller 63*b* of the mandrel 63 with the feed belt 64*f* interposed therebetween, and, as shown in FIG. 7, the follower pulley 64*e* is configured to support the mandrel 63 with the middle position roller 63*b* interposed therebetween as it enters the concave portion 63*e* formed in the mandrel 63.

PRIOR ART DOCUMENTS

Patent Documents

Patent Document 1: JP 11-091733 A

SUMMARY OF THE INVENTION

Problems to be Solved by the Invention

However, in a film opening mechanism as described above, although portions corresponding to the higher position rollers 63*a*, the middle position rollers 63*b*, and the lower position rollers 63*c* of the mandrel 63 are capable of providing sufficient gripping force with respect to the tubular film F as the follower pulleys 64*d* and 64*e* and the drive pulleys 64*a* of the film transport unit 64 nip the tubular film F with the feed belts 64*f* interposed therebetween, portions in which only the feed belts 64*f* nip the tubular film F in cooperation with the mandrel 63 are not capable of providing sufficient gripping force with respect to the tubular film F.

Therefore, there is a problem in that the tubular film F tends to slip with respect to the feed belts 64*f* and a deviation in timing of delivery of the tubular film F from the mandrel 63 may occur when the tubular film F is short and there is a state in which the tubular film F completely fails to be nipped between a roller and a pulley in the process of being transported on the mandrel 63.

On the other hand, when the tubular film F is long and, in the process of being transported on the mandrel 63, the tubular film F is always nipped between one of the rollers and a corresponding pulley, although a deviation in timing of delivery of the tubular film F from the mandrel 63 is not likely to occur, because a portion of the tubular film F which is not nipped between a roller and a pulley may slip, when, for example, a portion of the tubular film F on the downstream side in the transfer direction has slipped, the tubular film F may become wrinkled as the slipping portion on the downstream side in the transfer direction is pushed by a portion on the upstream side in the transfer direction which has not slipped.

To address these problems, an object of the present invention is to provide a film opening mechanism in which, regardless of whether a tubular film is long or short, a deviation in timing of delivery of the tubular film from a mandrel does not occur, and the tubular film does not become wrinkled.

Means for Solving the Problems

In order to solve the above-described problems, according to the invention as defined in a first embodiment, there is provided a film opening mechanism for delivering a tubular film collapsed into a sheet after it is opened into a predetermined shape, the film opening mechanism comprising a mandrel for causing the tubular film to be opened into a predetermined state by fitting it thereon; and at least a pair of feed belt units, each having a feed belt which nips the tubular film fitted on the mandrel in cooperation with the mandrel to transport the tubular film toward a lower side of the mandrel, wherein attraction means for attracting the mandrel and the feed belt to each other by a magnetic attractive force is provided.

Further, the invention as defined in a second embodiment has a feature in that, in the film opening mechanism according to the invention as defined in the first embodiment, the attraction means is composed of a magnet embedded in a portion of the mandrel in which the tubular film is nipped by the feed belts, and a magnetic material provided in the feed belts.

Further, the invention as defined in a third embodiment has a feature in that, in the film opening mechanism according to the invention as defined in the first or second embodiments, a coefficient of friction between a nip surface of the mandrel on which the tubular film is nipped by the feed belt and the tubular film is less than a coefficient of friction between the feed belt and the tubular film.

The magnetic attractive force exerted by the attraction means may be configured to vary depending on the location on the mandrel. Further, the magnetic attractive force exerted by the attraction means may be configured to be adjustable in the mandrel.

Advantages of the Invention

Because, as described above, the film opening mechanism according to the invention as defined in the first embodiment is provided with attraction means for attracting the mandrel and the feed belts to each other by a magnetic attractive force, it is also possible to provide sufficient gripping force with respect to the tubular film in portions in which only the feed belts nip the tubular film F in cooperation with the mandrel.

Therefore, even when the tubular film is short and there is a state in which the tubular film completely fails to be nipped between a roller and a pulley in the process of being transported on the mandrel, the tubular film does not tend to slip with respect to the feed belts and a deviation in timing of delivery of the tubular film from the mandrel is less likely to occur.

Further, even when the tubular film is long, because the tubular film does not partially slip and the overall tubular film is transported at a uniform transport rate, the tubular film is not likely to become wrinkled.

Further, in the film opening mechanism according to the invention as defined in the second embodiment, because the attraction means is composed of a magnet embedded in a portion of the mandrel in which the tubular film is nipped by the feed belts and a magnetic material provided in the feed belts, there is obtained an advantage in that the film opening mechanism is made simple and compact.

In the film opening mechanism according to the invention as defined in the third embodiment, because a coefficient of friction between a nip surface of the mandrel on which the tubular film is nipped by the feed belts and the tubular film is less than a coefficient of friction between the feed belts and the tubular film, the tubular film is further less likely to slip with respect to the feed belts, and it is possible to reliably transfer the tubular film.

By configuring the magnetic attractive force exerted by the attraction means to vary depending on location on the mandrel, it is possible to, for example, prevent the magnetic attractive force from becoming a resistance during a transition from a state in which no magnetic attractive force is acting to a state in which a magnetic attractive force is acting.

Further, by configuring the magnetic attractive force exerted by the attraction means to be adjustable in the mandrel, it is easy to fine-adjust the magnetic attractive force.

BRIEF DESCRIPTION OF THE DRAWINGS

FIG. 1 is a schematic front view showing an embodiment of a film fitting device in which a film opening mechanism according to the present invention is mounted.

FIG. 2 is a sectional view showing the film opening mechanism shown in FIG. 1.

FIG. 3 is a perspective view showing a mandrel included in the film opening mechanism shown in FIG. 2.

FIG. 4(a) is a side view showing the mandrel shown in FIG. 3, and FIG. 4(b) is a longitudinal sectional view showing the mandrel shown in FIG. 3.

FIG. 5 is an illustrative diagram showing an example in which permanent magnets having different magnetic attractive forces are embedded in the mandrel.

FIG. 6 is a sectional view showing another embodiment of the film opening mechanism.

FIG. 7 is a schematic front view showing a film fitting device in which a conventional film opening mechanism is mounted.

FIG. 8 is an enlarged front view showing a mandrel included in the film opening mechanism shown in FIG. 7.

EMBODIMENTS FOR CARRYING OUT THE INVENTION

Figure 1:
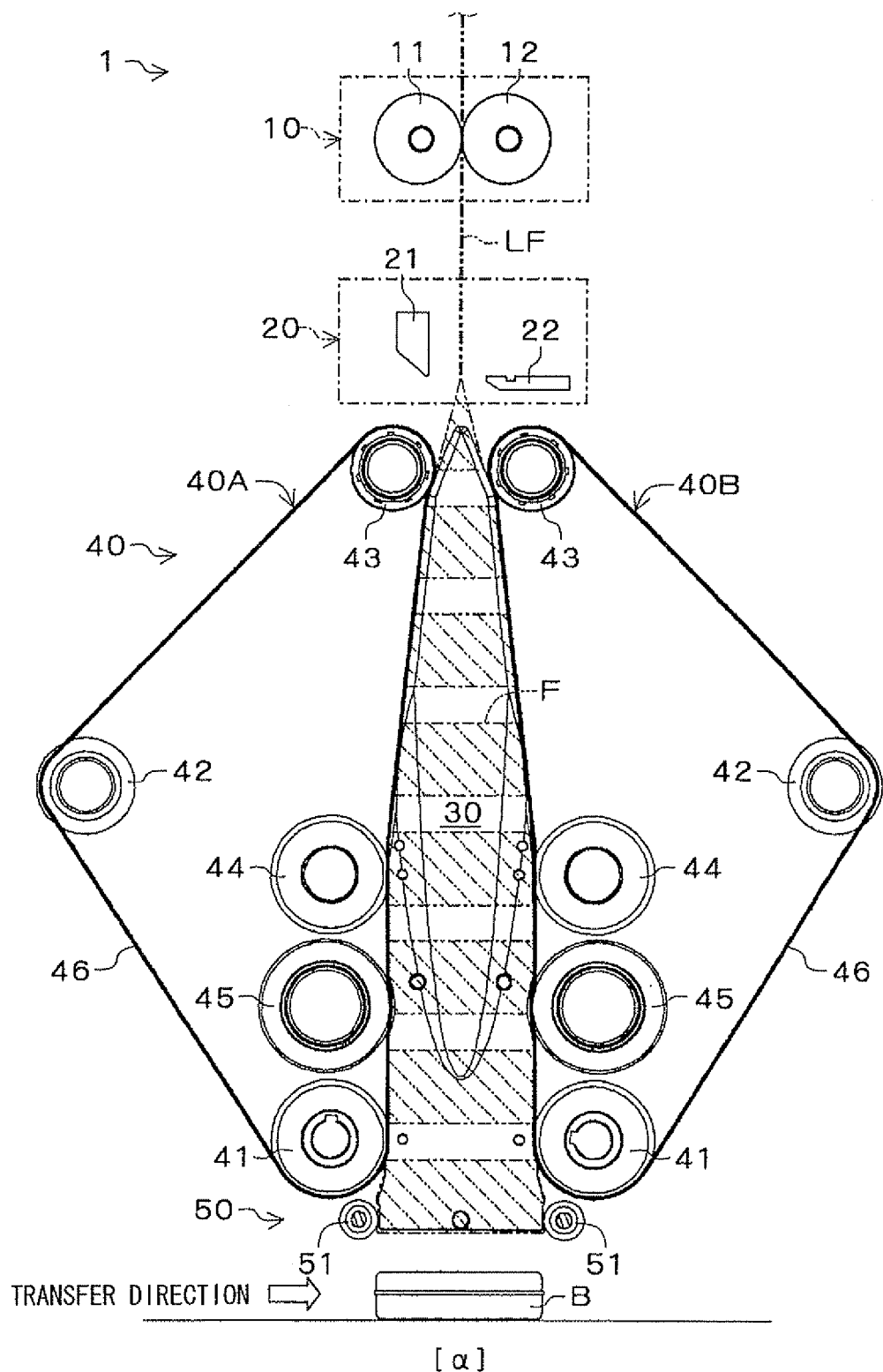
[FIG. 1]

Embodiments will be described below with reference to the drawings. FIG. 1 shows a film fitting device in which a film opening mechanism according to the present invention is mounted. As shown in FIG. 1, the film fitting device 1 is configured to, while separating individual tubular films F from a long film LF in which tubular films F are seamlessly connected to each other, and which is collapsed into a sheet, sequentially deliver the tubular films F to a film fitting position α to fit them each on the body of one of flat can containers (hereinafter referred to as "containers") B which are sequentially transferred to the film fitting position α with a predetermined transfer pitch by means of a conveyor belt. The film fitting device 1 includes a long film delivery unit 10 for drawing out and delivering the long film LF from a raw film roll (not shown) placed on a roll feeder, the long film delivery unit 10 having a drive roller 11 and a follower roller 12 which nip the long film LF therebetween; a film cutting unit 20 for cutting the long film LF which has been delivered by the long film delivery unit 10 into a predetermined length to form individual tubular films F, the film cutting unit 20 having cutting blades 21 and 22 which open and close as they are moved close to and apart from each other; an artillery shell shaped mandrel 30 on which a tubular film F cut from the long film LF by means of the film cutting unit 20 is fitted to open the tubular film F into a predetermined state; a film transport unit 40 for transporting the tubular film F fitted on the mandrel 30 toward a lower end of the mandrel 30; and a film delivery unit 50 for delivering the tubular film F which has been transported to a lower end portion of the mandrel 30 by means of the film transport unit 40 to the film fitting position α. The film opening mechanism according to the present invention is composed of the mandrel 30 and the film transport unit 40 described above.

The film fitting device 1 is configured to separate a tubular film F having a predetermined length by means of the film cutting unit 20 after an end portion of the long film LF which is cut by means of the film cutting unit 20 is fitted on the mandrel 30. In order to allow a cut edge of the long film LF which is in a pseudo bonded state to be reliably fitted on the mandrel 30, an inner guide unit (not shown) for releasing the pseudo bonded state of a cut edge of the long film LF is provided on an upstream side in a delivery direction of the long film LF in the film cutting unit 20.

Figure 3:
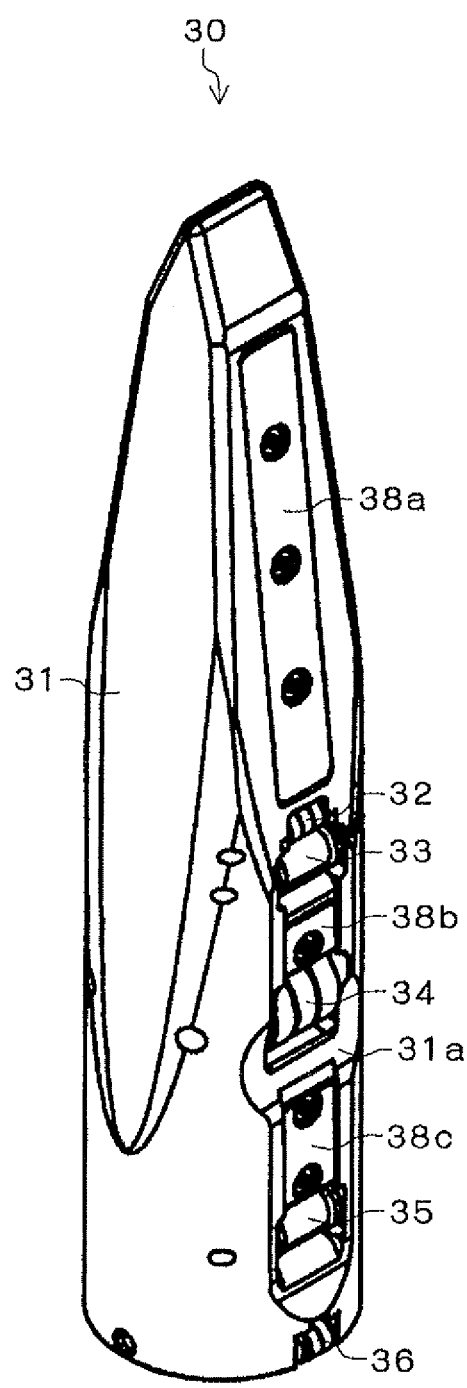
[FIG. 3]
Figure 4:
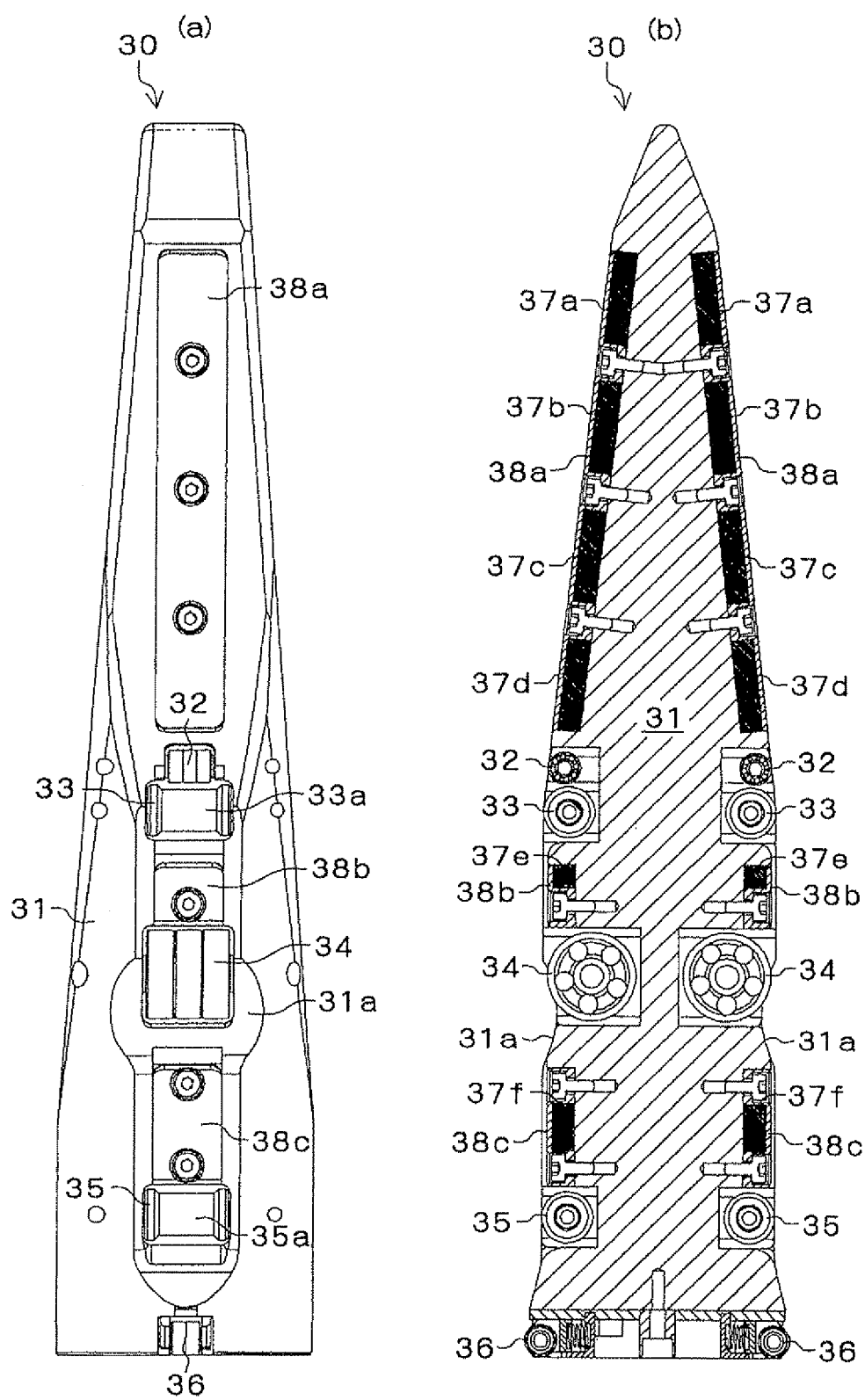
[FIG. 4]

As shown in FIGS. 3 and 4, the mandrel 30 has a metal main body 31 which is formed to have a tapered wedge shape on an upper end side and a circular shape on a lower end side, and is configured to cause the tubular film F fitted on the wedge-shaped upper end portion of the main body 31 to be shaped into a circular shape on the lower end portion of the main body 31 as the tubular film F is transported toward a lower side of the main body 31 and is thereby gradually opened.

In the main body 31, highest position rollers 32, higher position rollers 33, middle position rollers 34, lower position rollers 35, and lowest position rollers 36 are each rotatably supported on side surfaces of a lower half portion of the main body 31 on an upstream side and a downstream side in a transfer direction of the container B in a state in which the circumferential surfaces project slightly. On both side surfaces of the main body 31, concave portions 31a are formed to expose lower portions of the circumferential surfaces of the middle position rollers 34. The higher position rollers 33 and the lower position rollers 35 each have an outer surface whose both end portions in the width direction protrude toward the outside in the radial direction to form grooves 33a and 35a on the respective outer surfaces.

On both side surfaces of the main body 31 on which the rollers are attached, magnet housing recesses are formed above the highest position roller 32, between the higher position roller 33 and the middle position roller 34, and between the middle position roller 34 and the lower position roller 35. By fastening resin plates 38a, 38b, and 38c to the main body 31 with bolts to hold down permanent magnets 37a, 37b, 37c, 37d, 37e, and 37f with the resin plates 38a, 38b, and 38c in a state in which the permanent magnets 37a, 37b, 37c, 37d, 37e, and 37f are housed in the magnet housing recesses, the permanent magnets 37a, 37b, 37c, 37d, 37e, and 37f are held in the main body 31.

Figure 2:
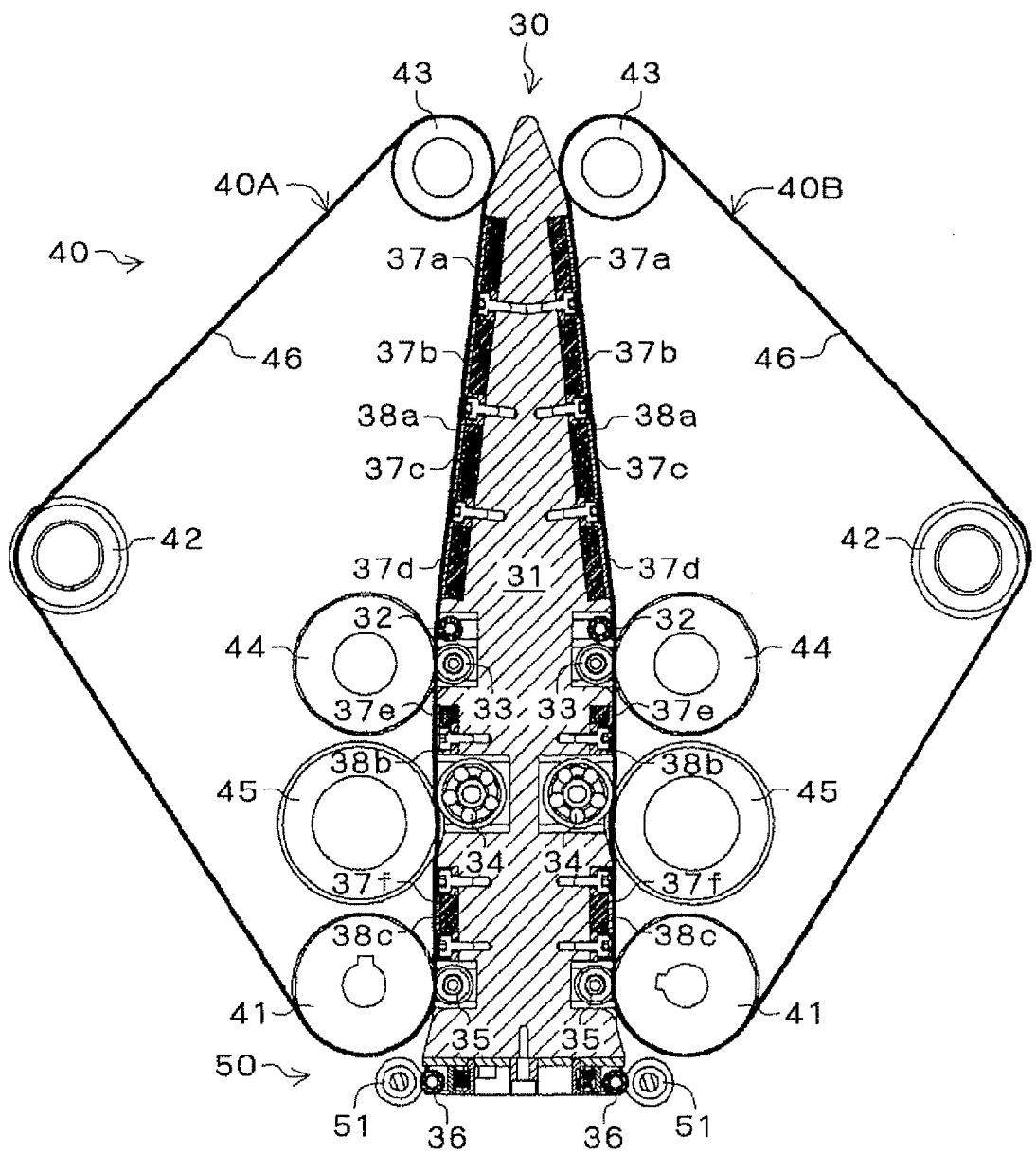
[FIG. 2]

As shown in FIG. 2, the film transport unit 40 is composed of an upstream-side feed belt unit 40A and a downstream-side feed belt unit 40B respectively provided on the upstream side and the downstream side of the mandrel 30 in the transfer direction of the container B, which nip the tubular film F cut from the long film LF by means of the film cutting unit 20 in a state in which it is fitted on the mandrel 30, in cooperation with the mandrel 30 to thereby transport the tubular film F toward a lower side of the mandrel 30. The upstream-side feed belt unit 40A and the downstream-side feed belt unit 40B are each composed of a drive pulley 41, four follower pulleys 42, 43, 44, and 45, and a feed belt 46 running around these pulleys.

The drive pulley 41 and the follower pulleys 44 and 45 are respectively provided at positions corresponding to the lower position roller 35, the higher position roller 33, and the middle position roller 34 of the mandrel 30, and are configured to nip the tubular film F in cooperation with the lower position roller 35, the higher position roller 33, and the middle position roller 34 with the feed belt 46 interposed therebetween.

The drive pulley 41 and the follower pulleys 44 and 45 in each of the upstream-side feed belt unit 40A and the downstream-side feed belt unit 40B are rotatably supported by the same supporting member, and the follower pulley 45 is configured to support the mandrel 30 as it enters the concave portion 31a formed in the main body 31 of the mandrel 30 to come into contact with the circumferential surface on the lower side of the middle position roller 34.

Further, the drive pulley 41 and the follower pulley 44 are respectively fitted into the groove 33a of the higher position roller 33 and the groove 35a of the lower position roller 35, and are configured to thereby position the mandrel 30 in the back-and-forth and side-to-side directions.

The feed belt 46 is a urethane timing belt in which a steel core is embedded, and is configured to be attracted to each of portions located above the highest position roller 32, a portion located between the higher position roller 33 and the middle position roller 34, and a portion located between the middle position roller 34 and the lower position roller 35 on each of the side surfaces of the main body 31 by magnetic attractive forces exerted by the permanent magnets 37a, 37b, 37c, 37d, 37e, and 37f embedded in the mandrel 30 on both side surfaces of the main body 31.

The permanent magnets 37a, 37b, 37c, 37d, 37e, and 37f all have the same magnetic attractive force (for example, 1.71 kgf, 2.53 kgf, 4.87 kgf, or the like). The feed belt 46 has a coefficient of static friction of 0.62 and a coefficient of kinetic friction of 1.74 with respect to the front surface of the tubular film F (a polyethylene terephthalate film whose back surface is entirely printed using white ink, NT-HILAMIC manufactured by Dainichiseika Color & Chemicals Mfg. Co., Ltd.). The resin plates 38a, 38b, and 38c (the resin material is polyacetal) have a coefficient of static friction of 0.26 and a coefficient of kinetic friction of 0.21 with respect to the back surface of the tubular film F (a polyethylene terephthalate film whose back surface is entirely printed using white ink, NT-HILAMIC manufactured by Dainichiseika Color & Chemicals Mfg. Co., Ltd.).

As shown in FIG. 2, the film delivery unit 50 includes shot rollers 51. The shot rollers 51 are respectively provided at positions corresponding to the lowest position rollers 36 of the mandrel 30. The shot rollers 51 receive the tubular film F which has been transported to a lower end portion of the mandrel 30 by means of the film transport unit 40, and nip it in cooperation with the lowest position rollers 36. The shot rollers 51 rotate using the rotational driving force of the drive pulleys 41 of the film transport unit 40. The film delivery unit 50 is configured to cause the tubular film F to be delivered from the lower end portion of the mandrel 30 to be fitted on a container B which has been transferred to the film fitting position α as the shot rollers 51 rotate in a state in which they nip the tubular film F in cooperation with the lowest position rollers 36.

Because, as described above, the film opening mechanism mounted in the film fitting device 1 is configured to cause the feed belt 46 of the film transport unit 40 in which a steel core is embedded to be attracted to each side surface of the main body 31 of the mandrel 30 by magnetic attractive forces of the permanent magnets 37a, 37b, 37c, 37d, 37e, and 37f embedded in the main body 31 of the mandrel 30, it is also possible to provide sufficient gripping force with respect to the tubular film F in portions in which the drive pulley 41 and the follower pulleys 44 and 45 do not nip the tubular film F in cooperation with the lower position roller 35, the higher position roller 33, and the middle position roller 34, and only the feed belt 46 nips the tubular film F in cooperation with the main body 31.

Therefore, even when, as shown in FIG. 1, the tubular film F is short and there is a state in which the tubular film F completely fails to be nipped by the drive pulleys 41 and the follower pulleys 44 and 45 in cooperation with the lower position rollers 35, the higher position rollers 33, and the middle position rollers 34 in the process of being transported on the mandrel 30, the tubular film F does not tend to slip with respect to the feed belts 46 and a deviation in timing of delivery of the tubular film F from the mandrel 30 is less likely to occur.

Further, even when the tubular film F is long, because portions of the tubular film F which are not nipped by the drive pulleys 41 and the follower pulleys 44 and 45 in cooperation with the lower position rollers 35, the higher position rollers 33, and the middle position rollers 34 and are nipped only by the feed belts 46 in cooperation with the main body 31 do not partially slip and the overall tubular film F is transported at a uniform transport rate in a stable state, the tubular film F is not likely to become wrinkled.

Further, because, as described above, a coefficient of friction of the feed belts 46 with respect to the tubular film F (the coefficient of static friction is 0.62, and the coefficient of kinetic friction is 1.74) is greater than a coefficient of friction of the resin plates 38a, 38b, and 38c with respect to the tubular film F (the coefficient of static friction is 0.26, and the coefficient of kinetic friction is 0.21), the tubular film F is further less likely to slip with respect to the feed belts 46, and it is possible to reliably transfer the tubular film F.

It should be noted that the coefficient of friction of the feed belts 46 with respect to the tubular film F and the coefficient of friction of the resin plates 38a, 38b, and 38c with respect to the tubular film F are not limited to the values described above, and it is only required that the materials, the surface properties, and the like of the feed belts 46 and the resin plates 38a, 38b, and 38c be configured such that "the coefficient of kinetic friction of the feed belts 46 with respect to the tubular film F" minus "the coefficient of kinetic friction of the resin plates 38a, 38b, and 38c with respect to the tubular film F" falls within the range of 1.0 or greater.

Figure 5:
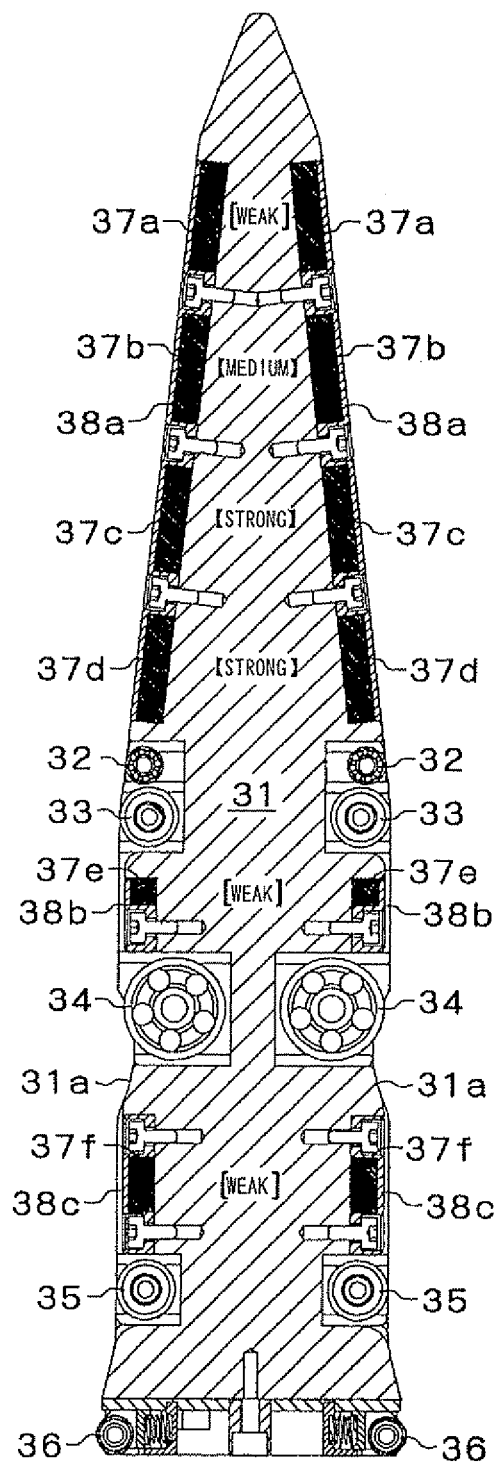
[FIG. 5]

Further, although, in the above-described embodiment, the permanent magnets 37a, 37b, 37c, 37d, 37e, and 37f having the same magnetic attractive force are used, the present invention is not limited to this embodiment. Permanent magnets having different magnetic attractive forces which vary depending on the location in which they are mounted may also be used. Specifically, as shown in FIG. 5, in order to prevent the magnetic attractive forces of the permanent magnets from becoming a resistance during a transition from a state in which no magnetic attractive force is acting to a state in which a magnetic attractive force is acting, a permanent magnet having a weak magnetic attractive force may be used as a permanent magnet 37a mounted in an upper end portion of the main body 31 and permanent magnets 37e and 37f respectively mounted subsequent to the higher position roller 33 and the middle position roller 34, a permanent magnet having a medium magnetic attractive force may be used as a permanent magnet 37b mounted subsequent to the permanent magnet 37a, and a permanent magnet having a strong magnetic attractive force may be used as two permanent magnets 37c and 37d mounted subsequent to the permanent magnet 37b.

Further, in order to adjust the force of attraction of the feed belt 46 with respect to the mandrel 30, it is only required to adjust the thicknesses of the permanent magnets 37a, 37b, 37c, 37d, 37e, and 37f embedded in the mandrel 30, and when further fine-adjustment is required, it is only required to adjust a distance between each permanent magnet 37a, 37b, 37c, 37d, 37e, or 37f and the feed belt 46 in which a magnetic material is embedded, or, in other words, a depth at which each permanent magnet 37a, 37b, 37c, 37d, 37e, or 37f is embedded.

Further, although, in the above-described embodiment, a steel core is embedded in the feed belt 46 of the film transport unit 40, the present invention is not limited to this embodiment. A feed belt formed from a resin into which powder composed of iron powder or another magnetic material is blended may also be used. It is also possible to coat a magnetic material over, or affix, for example, a magnetic material sheet to, the contact surface of the feed belt on which it contacts the tubular film F.

Figure 6:
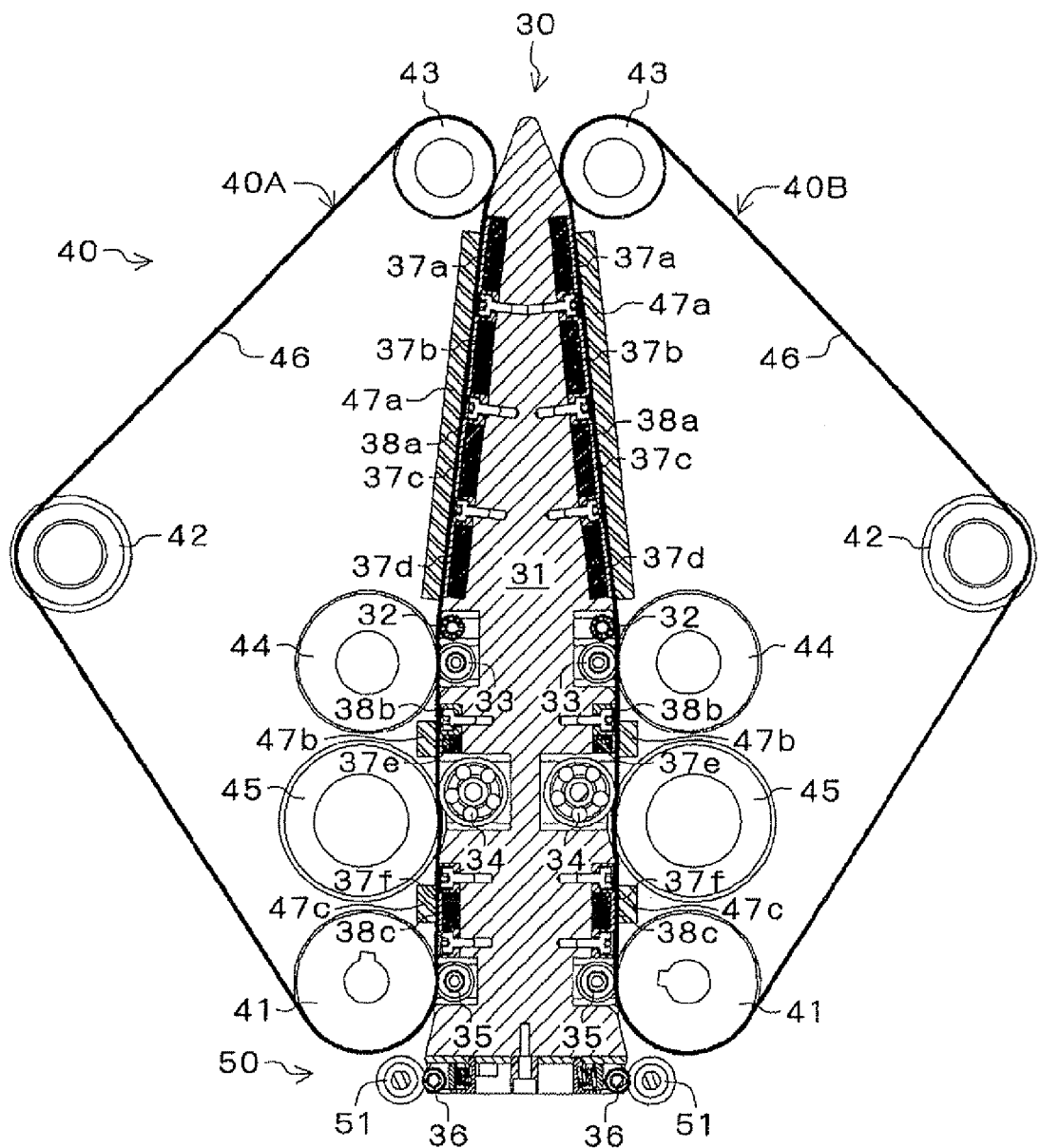
[FIG. 6]
Figure 7:
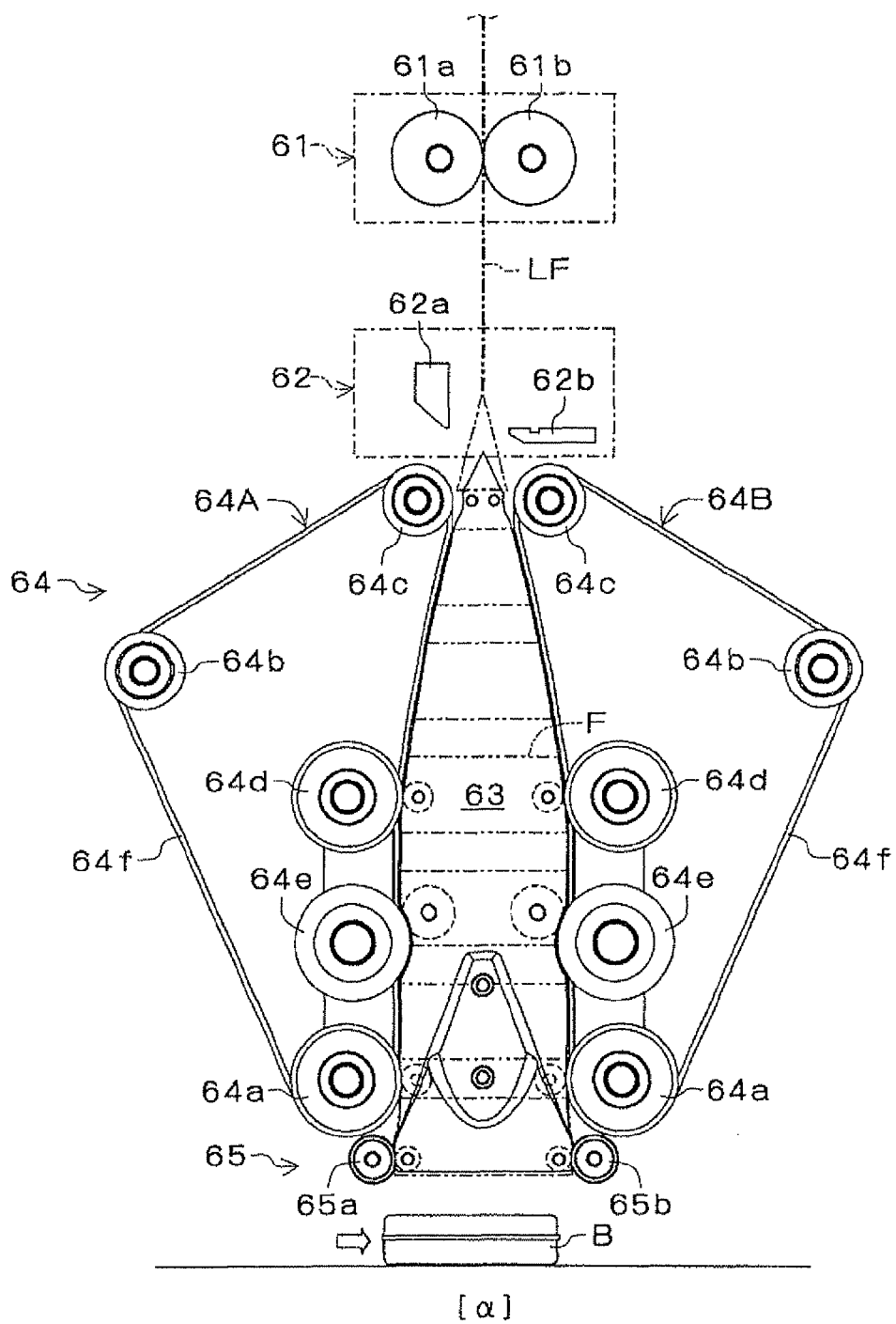
[FIG. 7]
Figure 8:
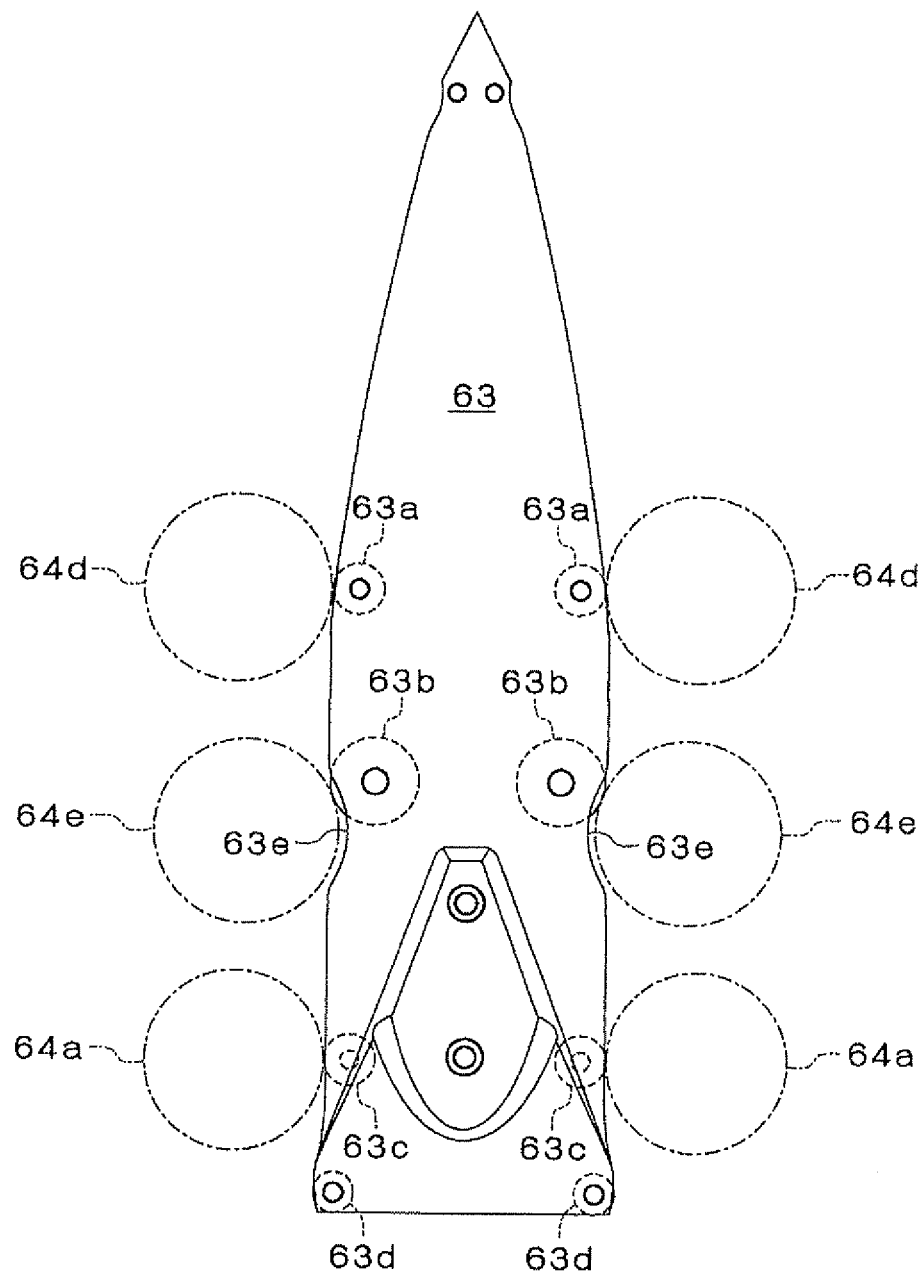
[FIG. 8]

Further, as shown in FIG. 6, a magnetic material plate 47a and magnetic material pieces 47b and 47c may also be supported such that they can be moved close to and apart from a side surface of the main body 31 of the mandrel 30 to allow the magnetic material plate 47a and the magnetic material pieces 47b and 47c to be attracted toward the mandrel 30 by magnetic attractive forces of the permanent magnets 37a, 37b, 37c, 37d, 37e, and 37f embedded in the main body 31 to thereby nip a feed belt having no magnetic material embedded therein, between the mandrel 30, and the magnetic material plate 47a and the magnetic material pieces 47b and 47c.

Conversely, it is also possible to support a magnetic plate or a magnetic piece composed of a permanent magnet such that it can be moved close to and apart from a side surface of the main body 31 of the mandrel 30, while forming the side surface of the main body 31 of the mandrel 30 from a magnetic material, to thereby allow the magnetic plate or the magnetic piece to be attracted toward the mandrel 30 by a magnetic attractive force of the magnetic plate or the magnetic piece to nip a feed belt having no magnetic material embedded therein, between the mandrel, and the magnetic plate or the magnetic piece.

Further, although permanent magnets are used in the above-described embodiments, the present invention is not limited to these embodiments. It is also possible to use electromagnets, and, when electromagnets are used, magnetic attractive forces can also be easily adjusted.

INDUSTRIAL APPLICABILITY

A film opening mechanism according to the present invention can be used in a device for fitting a tubular film such as a shrink label or a cap seal on a container or another object on which the tubular film is to be fitted.

Reference Numerals

1 FILM FITTING DEVICE
10 LONG FILM DELIVERY UNIT
11 DRIVE ROLLER
12 FOLLOWER ROLLER
20 FILM CUTTING UNIT
21, 22 CUTTING BLADE
30 MANDREL
31 MAIN BODY
31a CONCAVE PORTION
32 HIGHEST POSITION ROLLER
33 HIGHER POSITION ROLLER
33a GROOVE
34 MIDDLE POSITION ROLLER
35 LOWER POSITION ROLLER
35a GROOVE
36 LOWEST POSITION ROLLER
37a, 37b, 37c, 37d, 37e, 37f PERMANENT MAGNET (ATTRACTION MEANS)
38a, 38b, 38c RESIN PLATE
40 FILM TRANSPORT UNIT
40A UPSTREAM-SIDE FEED BELT UNIT
40B DOWNSTREAM-SIDE FEED BELT UNIT
41 DRIVE PULLEY
42, 43, 44, 45 FOLLOWER PULLEY
46 FEED BELT
47a MAGNETIC MATERIAL PLATE
47b, 47c MAGNETIC MATERIAL PIECE
50 FILM DELIVERY UNIT
51 SHOT ROLLER
B CAN CONTAINER
F TUBULAR FILM
LF LONG FILM

The invention claimed is:
1. A film opening mechanism for delivering a tubular film collapsed into a sheet after it is opened into a predetermined shape, the film opening mechanism comprising:
a mandrel for causing the tubular film to be opened into a predetermined state by fitting it thereon; and at least a pair of feed belt units, each having a feed belt which nips the tubular film fitted on the mandrel in cooperation with the mandrel to transport the tubular film toward a lower side of the mandrel, wherein attraction means for attracting the mandrel and the feed belt to each other by a magnetic attractive force is provided, the attraction means comprising a magnet embedded in a portion of the mandrel in which the tubular film is nipped by the feed belt and a magnetic material provided in the feed belt, wherein:

the mandrel comprises a conical portion having a diameter increasing as the location approaches a lower side, and a cylindrical portion provided below conical portion, and having an approximately constant diameter; and each of the feed belt units has a plurality of pulleys vertically arranged between a portion near an upper end of the cylindrical portion and a portion near a lower end of the cylindrical portion to nip the tubular film in cooperation with the cylindrical portion of the mandrel with the feed belt interposed therebetween; and the attraction means comprises magnets embedded in a portion of the mandrel in which the tubular film is nipped by the feed belt, at positions corresponding to a position between a portion near an upper end of the conical portion and a portion near a lower end of the conical portion, and a position between a pulley and a pulley which are included in the plurality of pulleys.

2. The film opening mechanism according to claim 1, wherein a coefficient of friction between a nip surface of the mandrel on which the tubular film is nipped by the feed belt and the tubular film is less than a coefficient of friction between the feed belt and the tubular film.

3. The film opening mechanism according to claim 2, wherein a difference between a coefficient of kinetic friction of the feed belt with respect to the tubular film and a coefficient of kinetic friction of the nip surface of the mandrel on which the tubular film is nipped by the feed belt with respect to the tubular film is 1.0 or greater.

4. The film opening mechanism according to claim 1, wherein the magnetic attractive force exerted by the attraction means is configured to vary depending on location on the mandrel.

5. The film opening mechanism according to claim 1, wherein the magnetic attractive force exerted by the attraction means is configured to vary depending on location on the mandrel such that the magnetic attractive force is weaker as the location approaches an upper or lower end of an area in which the magnetic attractive force is acting, and is stronger as the location approaches a center of that area.

6. The film opening mechanism according to claim 1, wherein the attraction means comprises a plurality of magnets vertically arranged and embedded in a portion of the mandrel in which the tubular film is nipped by the feed belt; and in the plurality of magnets, a magnetic attractive force of a magnet located in an upper or lower end is weaker than a magnetic attractive force of a magnet located in a center.

7. The film opening mechanism according to claim 1, wherein the magnetic attractive force exerted by the attraction means is configured to be adjustable in the mandrel.

8. The film opening mechanism according to claim 1, wherein the magnetic material is provided over an entire length of the feed belt.

9. The film opening mechanism according to claim 1, wherein the feed belt is a belt in which a core composed of a magnetic material is embedded.

10. The film opening mechanism according to claim 1, wherein the feed belt is formed from a resin into which powder composed of a magnetic material is blended.

11. The film opening mechanism according to claim 1, wherein a magnetic material is coated over a contact surface of the feed belt on which it contacts the tubular film.

12. The film opening mechanism according to claim 1, wherein a magnetic material sheet is affixed to a contact surface of the feed belt on which it contacts the tubular film.

13. The film opening mechanism according to claim 1, wherein each of the feed belt units has a plurality of pulleys vertically arranged to nip the tubular film in cooperation with the mandrel with the feed belt interposed therebetween; and the attraction means comprises a magnet embedded in a portion of the mandrel in which the tubular film is nipped by the feed belt, at least, at a position corresponding to a position between a pulley and a pulley which are included in the plurality of pulleys.

14. The film opening mechanism according to claim 1, wherein the magnet is fixed in a state in which the magnet is housed in a recess formed in a side surface of the mandrel; and a resin component covering the recess forms an outer surface of the mandrel.

15. The film opening mechanism according to claim 1, wherein the magnet is an electromagnet.

* * * * *